United States Patent [19]

Loy

[11] Patent Number: 4,710,621

[45] Date of Patent: Dec. 1, 1987

[54] OPTO-MECHANICAL SCANNER WITH FIXED-FIELD RANGING DEVICE

[75] Inventor: Fernand R. Loy, Sceaux, France

[73] Assignee: U.S. Philips Corporation, New York, N.Y.

[21] Appl. No.: 23,894

[22] Filed: Mar. 9, 1987

Related U.S. Application Data

[63] Continuation of Ser. No. 814,841, Dec. 30, 1985, abandoned.

[30] Foreign Application Priority Data

Jan. 11, 1985 [FR] France ................................ 85 00338

[51] Int. Cl.$^4$ .............................................. G01J 1/20
[52] U.S. Cl. .................... 250/203 R; 250/236; 250/334; 350/6.8
[58] Field of Search ................... 250/203 R, 234, 235, 250/236, 334; 244/3.16, 3.17; 356/5; 350/6.4, 6.5, 6.6, 6.7, 6.8, 6.9

[56] References Cited

U.S. PATENT DOCUMENTS 4,508,422 4/1985 Karlsson ............................. 350/6.8
4,542,986 9/1985 Berdanier ............................. 356/5

Primary Examiner—David C. Nelms
Assistant Examiner—Jessica L. Ruoff
Attorney, Agent, or Firm—Marc D. Schechter

[57] ABSTRACT

In an opto-mechanical scanner with associated scanning and ranging functions the scanning beam, obtained by line-scanning means and frame-scanning means, and the ranging beam converge on a scanning detector array and on a ranging detector, respectively. According the invention, the scanning and ranging beams traverse an arrangement of fixed optical elements which are arranged to ensure that the beams follow two different optical paths in such a way that the ranging beam traverses the line-scanning means two times. This ensures that the ranging beam has a fixed orientation which is independent of the line-scanning means.

11 Claims, 4 Drawing Figures

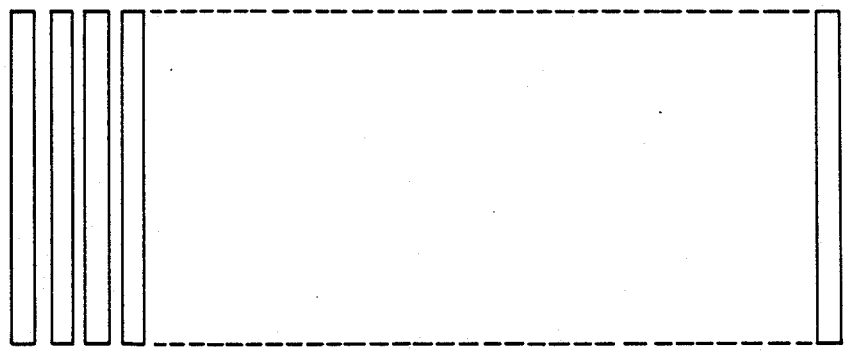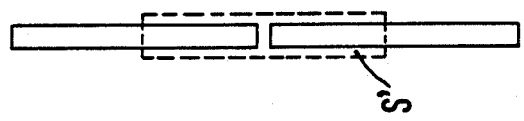
FIG.2

OPTO-MECHANICAL SCANNER WITH FIXED-FIELD RANGING DEVICE

This is a continuation of application Ser. No. 814,841, filed Dec. 30, 1985, now abandoned.

BACKGROUND OF THE INVENTION

The invention relates to an opto-mechanical scanner having a scanning function and an associated ranging function. The scanning field is obtained by line-scanning and frame scanning means. The ranging field is fixed during the propagation time of a ranging echo. The ranging source is a laser. The beams issuing from the scanning and ranging fields converge on a scanning detector array and on a ranging detector, respectively, which are arranged in the same cooled space.

Thermal imaging systems are known in which the scene is scanned point by point by means of an opto-mechanical scanner. Generally, these thermal cameras are equipped with infrared optical systems of large diameter.

When the thermal camera is used in conjunction with a laser ranging device the optical system of the ranging device also has a large diameter.

In order to reduce the dimensions and price of the arrangement it is advantageous to use the same optical system for scanning and for laser reception. Laser light is emitted externally of the thermal camera. The laser emitter uses a separate optical system whose axis extends parallel to the axis of the optical system for laser reception.

It is also advantageous to arrange the scanning and ranging detectors in the same cooled space, so that only one space has to be cooled.

It is conceivable that the scanning channel and the ranging channel are the same channel from the entrance optical system to the detector. This is possible in the case of scanners having only one scanning direction. In "parallel" scanners, which have as many detectors as there are scanning lines, this is the case because these scanners are of the slow-scanning type.

In "series" or "series-parallel" scanners, which have two scanning directions as in conventional television, line scanning is very rapid and frame scanning is slow. The orientation of the field being scanned varies very rapidly in the line direction, to such an extent that during the propagation time of the laser pulse between its emission and reception the orientation of the laser reception field has changed through an angle equal to several times the laser field. In order to overcome this problem different methods may be adopted.

It is possible, for example, to bypass the line-scanning by means of dichroic plates which reflect the laser radiation and which transmit the remainder of the infrared spectrum.

Alternatively, it is possible to bypass the line scanning sequentially by means of switchable optical elements.

One method has the disadvantage that elements such as the dichroic plates exhibit absorption. The other method has the disadvantage that switchable elements always give rise to synchronization problems.

SUMMARY OF THE INVENTION

It is an object of the invention to solve these problems by a method which ensures that the ranging beam has a fixed orientation which is independent of the line scanning.

According to the invention the scanning beam and the ranging beam traverse a common entrance optical system and an arrangement of fixed optical elements arranged to make the beams follow two different optical paths. The ranging beam traverses the line-scanning means twice, which ensures that it has a fixed orientation which is independent of the line scanning. The scanning function and the ranging function are performed simultaneously, and require no switching of optical elements. The laser pulse is emitted in a specific position of the line-scanning and frame scanning means.

BRIEF DESCRIPTION OF THE DRAWING

FIG. 2 schematically shows the detectors.

DESCRIPTION OF THE PREFERRED EMBODIMENTS

Figure 1:
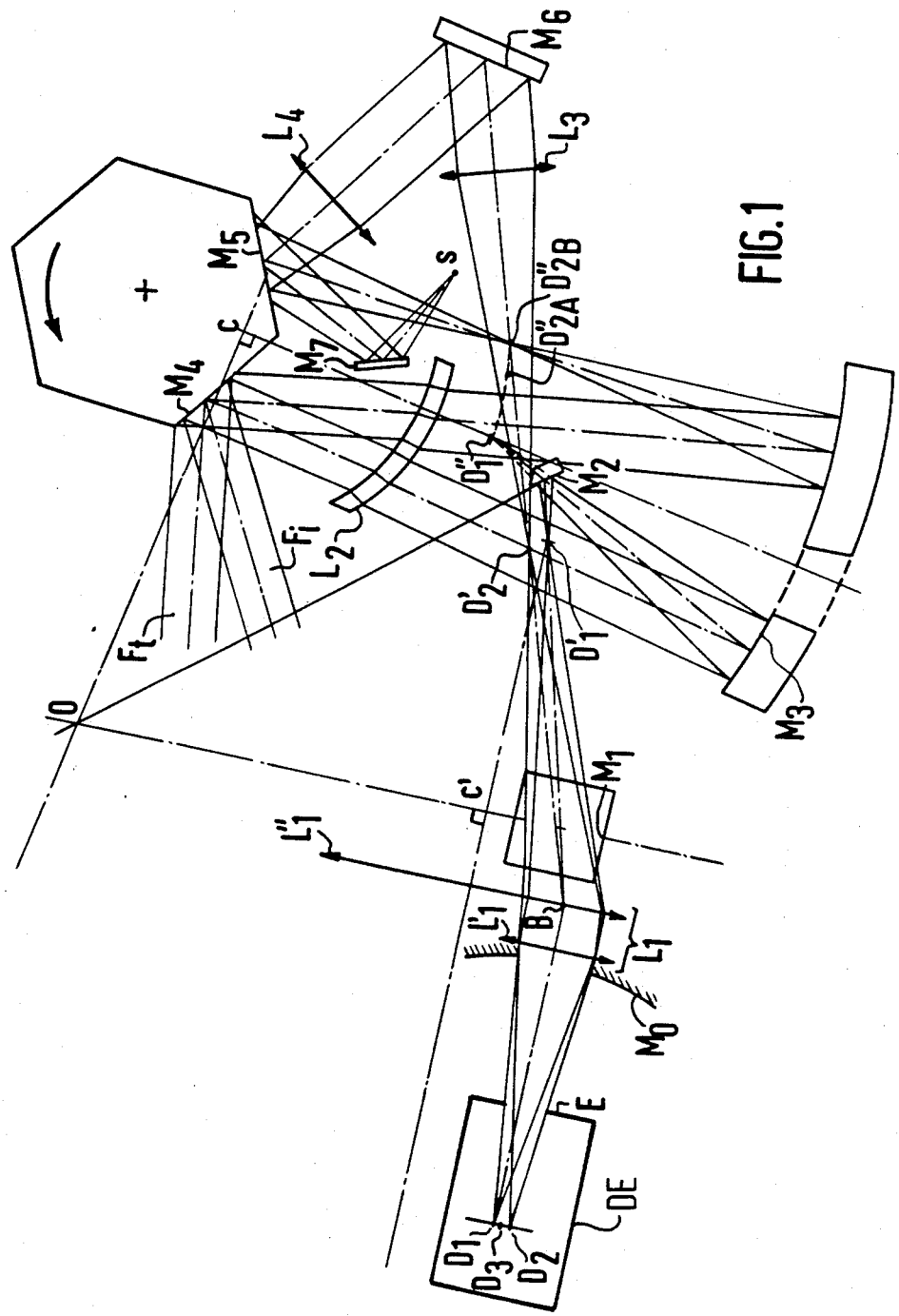
FIG. 1 is a schematic diagram of an embodiment of the invention.

The opto-mechanical scanner according to the invention shown in FIG. 1 has a scanning field of $\pm 30°$ with an entrance pupil of 12.5 mm diameter. It may be preceded by an afocal system for the observation of a narrow field. This afocal system may have, for example, a magnification of 20. The field may be $3° \times 3°$ with an entrance pupil of 250 mm diameter.

The scanning function is provided by the following optical elements:
a detector array D1 which is arranged in a Dewar vessel DE and whose field of view is bounded by a cold shield E and by a perforated spherical mirror $M_0$ which is centered, for example, relative to D1,
a refractive image-transfer means L1 comprising two lenses $L'_1$ and $L''_1$,
a frame-scanning mirror M1 for a convergent beam.

In FIG. 1 these elements are shown in projection although in reality they are situated in a plane perpendicular to the plane of the Figure.

Further optical elements which provide the scanning function are:
a plane mirror M2,
a pupil transfer means which is concentric with a center C and which comprises a spherical mirror M3 and a spherical germanium correction lens $L_2$, and
a rotating polygon having six faces for the parallel beam.

At a given instant the incident scanning beam $F_i$ is reflected, for example, by the face $M_4$ of the polygon.

A beam issuing from the detectors D1 and following a path which is the reverse of the median incident beam originating from the field of view converges at $D'_1$. $D'_1$ is the real image of $D_1$ formed by the elements L1 and M1. The virtual image $D''_1$ of D1 in the mirror M2 is situated in the focal plane of the pupil transfer means M3, L2 which is concentric with the center C.

The normal to the principal axis $CD''_1$ of the pupil transfer means (M3, $L_2$) at C intersects the plane of the mirror M2 in O.

The frame-scanning mirror M1 rotates about the axis $OC'$ which is the image of OC in the mirror M2.

The lens system L1 comprises two lenses $L'_1$ and $L''_1$. The lens $L''_1$ has its focus at $D'_1$. It is centered about the axis $D'_1 C'$. The lens $L'_1$ is centred about the axis $BD_1$ parallel to $D'_1 C'$.

If the plane of the detector array D1 is perpendicular to the axis $BD_1$, the plane of the image $D'_1$ is perpendicular to $D'_1C'$ and the plane of the image $D''_1$ is perpendicular to the principal axis $CD''_1$.

The entrance pupil of the scanner is situated substantially on the face M4 of the polygon, which rotates about an axis perpendicular to the plane of the Figure. The pupil transfer means $L_2$, M3 forms the image of this entrance pupil on the frame-scanning mirror M1. Mirror M1 is driven with a sawtooth motion about the axis OC'.

The detector D1 has a fixed field of view.

The scanning efficiency is approximately 0.8 for the frame motion (i.e. the ratio between the interval up to the instant at which the maximum amplitude is reached and the interval up to the instant at which the flyback to zero amplitude is completed for this sawtooth scanning mode).

The scanning efficiency is approximately 0.5 for the line motion. This is because the scanning beam is rotated through an angle which is half of the angle through which the radius of the polygon is rotated.

The ranging function is provided by the following optical elements:
a ranging detector D2 arranged in the same Dewar vessel as the scanning detector,
the refractive image-transfer means L1,
the frame-scanning mirror M1,
the image-transfer means comprising the lenses $L_3$ and $L_4$, the mirror M6 which reflects the beam from $L_3$ to $L_4$, and the face M5 of the polygon,
the pupil transfer means $L_2$ and M3, and
the face M4 of the polygon which reflects the incident ranging beam $F_t$.

The ranging beam traced backward from the detector D2 and following the path of the median beam which is incident from the field of view converges in $D'_2$, which is the real image of D2 formed by the elements M1 and L1. The image transfer means comprising $L_3$, M6, $L_4$ and the face M5 of the polygon which reflects the beam for the first time as a convergent beam, forms a real image of $D'_2$ in the focal plane of the pupil transfer means, the positions being variable from $D''_{2A}$ to $D''_{2B}$ depending on the angular displacement of the polygon. $D''_{2A}$ is the position at the instant at which the laser pulse is emitted. $D''_{2B}$ is the position at the instant at which the laser echo is received for the maximum range of the laser ranging device. The basic diagram of FIG. 1 applies to this last-mentioned position.

According to the invention, the ranging path thus differs from the scanning path. The ranging function does not require the use of any switchable optical elements. The ranging and scanning functions are simultaneous.

Although the image of the scene formed by the scanning device travels over the detectors $D_1$ as the polygon rotates, the image of the scene formed by the ranging device is stationary relative to the detector D2 when the polygon rotates. In the present embodiment, the ranging field is substantially fixed if the position of the polygon relative to $CD''_1$ is selected so that $HD''_{2A}$ is substantially equal to $CD''_1$ at the instants at which the ranging pulses are emitted. H is the path on the polygon of the axis of the beam passing through $D''_2$. This field coincides with the reticule of the scanner.

The laser is fired in synchronism with the scans of the scanner when the frame-scanning mirror is in the "vertical-field center" position and when the polygon is in the "field center+8°" position.

Ranging is possible between the polygon positions "field center+8°", corresponding to a target at zero distance and "field center+12°" corresponding to a target at 9 km distance. This limitation is dictated by the dimensioning of the optical elements of the pupil transfer means.

During the propagation time of the light pulse, which is approximately 60 μs for distances smaller than 9 km, the movement of the frame-scanning mirror is negligible relative to the size of the ranging field.

The reticule of the scanner is situated in the center of the laser reception field. The reticule is generated by means of a rectangular source S (measuring 50 μm×400 μm), a mirror M7 for reflecting the beam issuing from this source S to the first face M5 of the polygon which reflects the ranging beam, and the other optical elements of the ranging path. The elements $L_3$, $L_4$, $M_6$ of the image transfer means, the frame-scanning mirror M1 and the refractive image transfer means L1 ensure that a real image of the source S is formed on a reticule-triggering detector D3 arranged in the same Dewar vessel as the scanning detector D1 and the ranging detector D2.

FIG. 2 shows the arrangement of the three detectors in one common Dewar vessel. The scanning detector D1 comprises 31 rectangular elements known under the trade name SPRITE. Each detector element measures 62.5 μm×700 μm.

The ranging detector D2 is a square element measuring 300 μm×300 μm.

The reticule trigger detector D3 comprises two rectangular elements, each measuring 50 μm×500 μm.

The image S' of the source shown in dotted lines scans the detector D3 horizontally and vertically. At the instant at which the image S' passes over the two elements of the detector D3, the horizontal scan causes two signals to occur whose amplitudes are proportional to the areas of the two elements of D3 covered by S'. These signals start the display of the vertical bar of the reticule. If an amplitude comparison between these two signals shows that they are equal, the horizontal bar of the reticule is displayed. The frame-scanning mirror M1 then occupies the "field center" position. This device is completed by an analog transducer secured to the mirror M1 to control the amplitude of the sawtooth for the vertical scan.

The reticule is stable because the reticule's optical path is substantially the same as the ranging path. Therefore, the synchronization between the ranging field and the reticule is independent of possible tolerances of all the optical elements which are common to the two paths.

Figure 3:
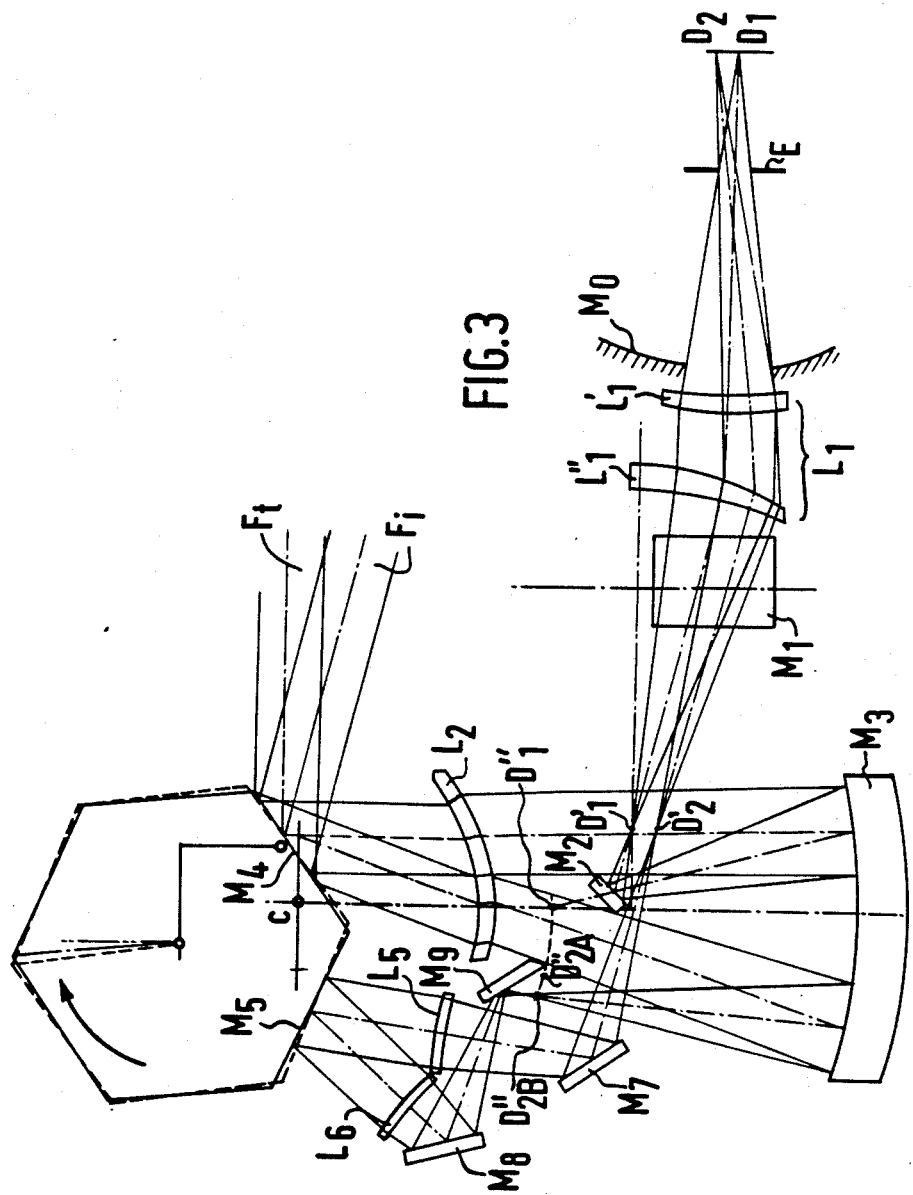
FIGS. 3 and 4 schematically show a first modification and a second modification, respectively, of the Figure embodiment.

In FIG. 3, which shows a first modification of the opto-mechanical scanner according to the invention, corresponding elements bear the same references as in FIG. 1.

The scanning path is identical and the scanner again comprises the detectors D1, the cold shield E, the spherical mirror $M_0$, the refractive image-transfer means L1, the frame-scanning mirror M1, and the mirror M2 (for reflecting the beam from $D'_1$ to the pupil transfer means $L_2$ and M3, which projects the beam toward infinity in a direction determined by the angular position of the polygon).

The image transfer means of the ranging path is modified to ensure that the image $D'_2$ of the detector D2 is situated at the focus of a lens $L_5$ in such a way that the ranging beam is first deflected by a plane mirror M7 and is subsequently imaged on the face M5 of the polygon as a parallel beam.

The beam which is reflected from face $M_5$ is then passed through a focusing and folding system. The focusing and folding system comprises a lens $L_6$ in combination with the plane mirrors M8 and M9. The beam is focused in the focal plane of the pupil transfer means in a position from $D''_{2A}$ to $D''_{2B}$ depending on the angular displacement of the polygon. Subsequently, the ranging beam is projected toward infinity as stated above.

The position of the polygon shown in dotted lines in FIG. 3 corresponds to the instant at which the laser pulse is emitted. When the polygon is rotated 12° out of this position the maximum range of the ranging device is reached and the polygon has assumed the position shown in solid lines, which corresponds to the instant at which the laser echo is received.

This first modification enables the direction in which the ranging beam is projected to be absolutely independent of the angular position of the polygon. For this purpose it is necessary and adequate that the focal length of the lens $L_6$ is equal to the focal length of the pupil transfer means $L_2$ and M3.

Figure 4:
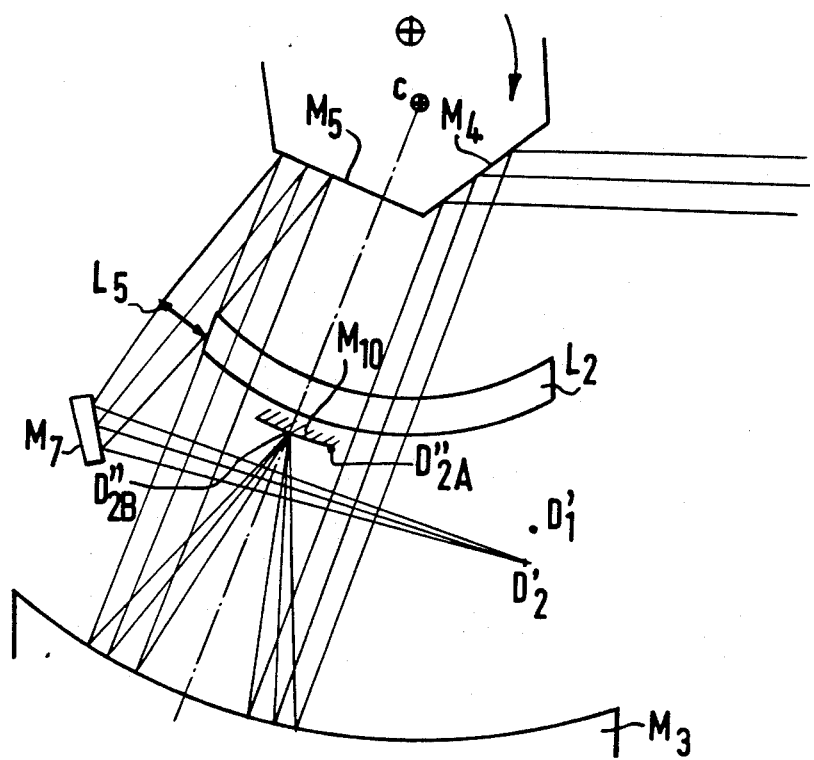

FIG. 4 shows a second modification of the opto-mechanical scanner according to the invention. In FIG. 4, the elements corresponding to those in FIGS. 1 and 2 bear the same reference numerals.

The scanning function is identical to that in the scanners described above and this function is therefore not illustrated in FIG. 4.

The ranging function, traced backward from the image $D'_2$ of the detector, always forms an image in the focus of the lens $L_5$ associated with the mirror M7.

The characteristic feature of the FIG. 4 modification of the scanner is the use of the pupil transfer means to form the focusing and folding system. After its first reflection from the polygon as a parallel beam, the ranging beam traverses the pupil transfer means $L_2$ and M3 and is focused in $D''_{2A} \ldots D''_{2B}$ depending on the angular position of the polygon. A convex spherical mirror M10, which coincides with the focal plane of the pupil transfer means, reflects the beam to M3 and subsequently to the polygon via $L_2$. Since the two halves of $L_2$ and $M_3$ have obviously the same focal length, the direction of the ranging beam will be independent of the angular position of the polygon.

The two modifications of the scanner also have a reticule function, not shown, such that the beam which issues from a reticule source follows the path of the ranging beam after reflection from a face of the polygon.

It is possible to pass the entire ranging beam through the cold shield whose dimensions are dictated by the scanning channels and thus not affect the sensitivity of the scanning detector. To achieve this two requirements must be met:

1. The image transfer means of the scanning device should have a magnification which differs from that of the image transfer means of the ranging device in such a way that for the same dimensions of the entrance pupils of the scanning device and the ranging device the aperture of the beam which converges on the ranging detector is smaller than the aperture of the beam which converges on the scanning detector.

2. The respective positions of the scanning detector and the ranging detector in the Dewar vessel should be chosen in an appropriate manner.

If these requirements are met the addition of the ranging channel will not affect the performance of the scanning channel.

The diagram shown in FIG. 3 is in conformity with these requirements.

What is claimed is:

1. An opto-mechanical scanner having a scanning function and an associated ranging function, the scanning field being obtained by line-scanning and frame scanning means and the ranging field being fixed during the propagation time of a ranging echo the ranging source, being a laser, the beams issuing from said fields converging on a scanning detector array and on a ranging detector respectively, which are arranged in the same cooled space, characterized in that said scanning beam and said ranging beam traverse a common entrance optical system and an arrangement of fixed optical elements arranged to make said beams follow two different optical paths such that the ranging beam traverses said line-scanning means twice, which ensures that it has a fixed orientation which is independent of the line scanning, said scanning function and said ranging function being simultaneously and requiring no switching of optical elements, and the laser pulse being emitted in a specific position of said line-scanning and frame scanning means.

2. A scanner as claimed in claim 1, characterized in that from the detectors towards the scene said arrangement of optical elements comprises:

for the scanning path:
a refractice image transfer means followed by a plane mirror or frame-scanning mirror, which form a real image of the detector array D1 at $D'_1$, a plane mirror which diverts the scanning beam issuing from $D'_1$ to a pupil transfer means which is concentric with a centre C and which comprises a mirror and a spherical lens, the virtual image $D''_1$ of $D'_1$ in the diverting mirror being situated in the focal plane of said pupil transfer means, said frame-scanning mirror rotating about an axis which together with the normal to $D''_1 C$ at C is situated symmetrically with respect to said diverting mirror, the beam issuing from $D''_1$ traversing the pupil transfer means and being subsequently reflected as a parallel beam from a face of a polygon which rotates about its axis of symmetry and which constitutes said line scanning means, for the ranging path:
said refractive image transfer means and frame-scanning mirror which form a real image of the detector D2 in $D'_2$, an image transfer means for said image which after a first reflection of the ranging beam from a face of the polygon is re-imaged in the focal plane of the pupil transfer means as a real image which displaces from a first position ($D''_{2A}$) to a second position ($D''_{2B}$) depending on the angular displacement of the polygon, the first position being the position at the instant at which the laser pulse is emitted and the second position being the position at the instant at which the laser echo is received for the maximum range of the ranging laser, said polygon face from which the ranging beam is reflected the first time adjoining said face from which the scanning beam is reflected in the direction of rotation, the beam traversing the pupil transfer means and being incident again on the polygon to be reflected a second time as a parallel beam from the same face as the scanning beam.

3. A scanner as claimed in claim 2, characterized in that said image transfer means in the ranging path comprises two lenses, one mirror and a polygon face which reflects the ranging beam a first time as a convergent beam, a substantially fixed orientation of the beam emerging after a second reflection from the polygon being obtained if the position of said polygon relative to $CD''_1$ is chosen so that $HD''_2$ is substantially equal to $CD''_1$ at the instant at which the ranging laser emits a pulse (H being the path of the axis of the beam passing through $D''_2$ on the polygon).

4. A scanner as claimed in claim 2, characterized in that said image transfer means in the ranging path comprises a lens whose focus is situated in $D'_2$, a mirror, and the polygon surface from which the ranging beam is reflected a first time as a parallel beam, a focusing and diverting system for said beam ensuring that images are formed in $D''_{2A} \ldots D''_{2B}$ and that the beam is transmitted to the pupil transfer means mirror, a fixed orientation of the beam which emerges after a second reflection from the polygon being ensured if the focal length of said focusing and diverting system is equal to the focal length of the pupil transfer means.

5. A scanner as claimed in claim 4, characterized in that said focusing and diverting system comprises a lens in combination with two plane mirrors.

6. A scanner as claimed in claim 4, characterized in that said focusing and diverting system comprises said pupil transfer means and a convex spherical mirror which coincides with the focal plane of said pupil transfer means.

7. A scanner as claimed in claim 1 and any one of the claims 2 to 6, characterized in that the laser pulse is emitted when the frame-scanning is in the "vertical-field centre" position and when the polygon is in the "field centre + $\alpha$" position, $\alpha$ being an angle of the order of a few degrees.

8. A scanner as claimed in any one of the claims 2 to 7, characterized in that the respective positions of the scanning and ranging detectors in a Dewar vessel are selected in an appropriate manner, the scanning-image transfer means having a magnification which differs from that of the ranging-image transfer means in such a way that for the same diameter of the entrance pupil in the ranging device and that in the scanning device the aperture of the beam which converges on the ranging detector is smaller than the aperture of the beam which converges on the scanning detector, the entire ranging beam passes through a cold shield which is dimensioned in conformity with the scanning beam, and the performance of the scanning channel is not affected by the addition of the ranging channel.

9. A scanner as claimed in any one of the claims 2 to 8, characterized in that there is also provided a reticle generating function comprising a rectangular source, a mirror for reflecting the beam issuing from said source to said first-reflection face of the polygon for the ranging beam, said other optical elements for the ranging function ensuring that the image of said rectangular source is formed and a reticle triggering detector is scanned by said image in horizontal and vertical directions, which reticle triggering detector is arranged in the same Dewar vessel as the scanning and ranging detectors.

10. A scanner as claimed in claim 9, characterized in that said reticle-triggering detector comprises two separate elements which are superposed along a vertical axis and which are scanned by said image of the rectangular source, each horizontal scan causing the simultaneous generation of two signals whose amplitudes are respectively proportional to the areas of said detector elements covered by the image of the source and causing the vertical bar of the reticle to appear, and the result of the comparison of said signals, when these signals are equal, causing the horizontal bar of the reticule to appear, thereby defining the "vertical-field centre" position.

11. An opto-mechanical scanner comprising:
a cooling vessel;
a scanning detector array arranged in the cooling vessel;
imaging means for generating an image of a scene, said image being arranged at the scanning detector array;
line-scanning means for scanning the image of the scene across the scanning detector array in a line direction;
frame-scanning means for scanning the image of the scene across the scanning detector array in a frame direction transverse to the line direction;
a laser source for illuminating an object in the scene with a ranging beam, said object reflecting the ranging beam back to the scanner;
a ranging detector arranged in the cooling vessel;
focusing means for focusing the reflected ranging beam onto the ranging detector; and
pulse means for causing the laser to emit ranging beam pulses;
characterized in that the imaging means and the focusing means comprise:
an entrance optical system for receiving radiation from the scene and for receiving the reflected ranging beam; and
an arrangement of fixed optical elements for receiving radiation from the scene and for receiving the reflected ranging beam, said fixed optical elements arranged to guide the radiation from the scene and the ranging beam along two different paths, said fixed optical elements guiding the ranging beam to the ranging detector while traversing the line-scanning means twice so as to ensure that the ranging beam has a fixed orientation independent of the line-scanning means; and
characterized in that:
the pulse means causes the laser to emit ranging beam pulses at a specific position of the line-scanning means and of the frame-scanning means; and
the radiation from the scene is incident on the scanning detector array and the ranging beam is incident on the ranging detector simultaneously without switching optical elements.

* * * * *